United States Patent [19]

Hohl

[11] 4,407,371
[45] Oct. 4, 1983

[54] COULTER ATTACHMENT FOR SEED PLANTING APPARATUS

[76] Inventor: Gregory D. Hohl, R.R. 1, Box 13, Donnellson, Iowa 52625

[21] Appl. No.: 278,716

[22] Filed: Jun. 29, 1981

[51] Int. Cl.³ .......................... A01C 5/06; A01B 35/28
[52] U.S. Cl. .................................... 172/253; 172/166; 172/482; 111/1; 111/59
[58] Field of Search ............... 172/247, 248, 253, 482, 172/166, 309, 478, 479, 640, 297, 302; 111/52, 59, 60, 61, 1, 85-87

[56] References Cited

U.S. PATENT DOCUMENTS

| | | | |
|---|---|---|---|
| 1,220,449 | 3/1917 | Patterson | 172/482 |
| 1,473,003 | 11/1920 | Berry | 97/53 |
| 2,070,425 | 2/1935 | Engel | 97/53 |
| 2,335,175 | 11/1943 | Davenport | 172/297 |
| 2,593,679 | 4/1952 | Kaupke | 97/50 |
| 2,701,513 | 2/1955 | Hyland | 172/479 X |
| 2,756,657 | 7/1956 | Toland | 172/297 |
| 3,122,111 | 2/1964 | Taylor | 111/80 |
| 3,265,137 | 8/1966 | Couser | 111/1 |
| 3,314,386 | 4/1967 | Kopaska | 111/52 |
| 3,326,301 | 6/1967 | Foster | 172/482 X |
| 3,389,754 | 6/1968 | Allison | 172/389 |
| 3,389,754 | 6/1968 | Allison | 172/389 |
| 3,523,585 | 8/1970 | Godbersen | 172/311 |
| 3,581,827 | 6/1971 | Ratcliff | 172/307 |
| 3,673,970 | 7/1972 | Hatcher | 111/85 |
| 3,701,327 | 10/1972 | Krumholz | 111/81 |
| 3,747,422 | 7/1973 | Rikli | 111/1 |
| 3,752,238 | 8/1973 | Chilton | 172/180 |
| 3,756,203 | 9/1973 | Dedoes | 172/464 |
| 3,826,315 | 7/1974 | Blair | 172/514 |
| 4,187,916 | 2/1980 | Harden et al. | 172/146 |
| 4,227,581 | 10/1980 | Klotzbach | 172/142 |

OTHER PUBLICATIONS

Row-Crop Planters-Published for Allis-Chalmers, Milwaukee, WI 1/79, p. 10.
Farm Journal Magazine, Jan. 1982, p. 22, Item 27.
Allis-Chalmers, "Conservation Tillage" John Deere, Drawn and Integral Planters, pp. 26, 27, 32, 33.

Primary Examiner—Richard J. Johnson
Attorney, Agent, or Firm—Bacon & Thomas

[57] ABSTRACT

Apparatus is disclosed which facilitates the ready attachment and detachment of coulters to a standard seed planting device. The seed planting device is typically of a type that is towed behind a tractor and automatically furrows the ground, deposits the seeds in the furrows at spaced intervals and covers the seeds over. The disclosed apparatus allows an operator to readily attach a plurality of coulters to this planting device thereby enabling its use for minimum-till, or no-till farming operations. The coulters are attached to a framework which is bolted onto the planter frame. This framework may be readily removed as a unit to enable the use of the planter in its standard condition. The framework locates the coulters in a forwardmost direction to increase the downward force on same so as to enable no-till farming operations with hard or rocky soil. This location of the coulters eliminates the need for ballast weights.

3 Claims, 9 Drawing Figures

COULTER ATTACHMENT FOR SEED PLANTING APPARATUS

FIELD OF THE INVENTION

The present invention relates to a structure for attaching coulters to a seed planting device so as to enable the use of the standard seed planter in minimum-till or no-till farming operations.

BRIEF DESCRIPTION OF THE PRIOR ART

In order to plant crops, the prior art apparatus required the farmer to undertake numerous operations prior to performing the actual planting. These included plowing, disk or tooth harrowing, cultivating and planting. In many cases, these individual steps were performed two or more times in order to properly prepare the soil. Quite obviously, this method required the farmer to make numerous trips back and forth across his land and utilize numerous implements. This is an extremely time consuming procedure which also requires vast expenditures in energy costs.

Another drawback was that the tilling or cultivation of the entire soil surface resulted in soil erosion by wind and rain. Often, the changing weather conditions between the farming operation steps would negate the effect of one step and cause the farmer to repeat it at a later date. The erosion factor has resulted in a movement toward minimum-till or no-till farming operations wherein only the very minimum amount of soil is cultivated, typically only enough to insure proper insertion and germination of the plant crop in the soil. The stubble from the previous crop is left in the ground and serves to retain the soil in place and prevent erosion.

This stubble that is left in the ground with minimum-till or no-till farming presents its own set of problems to the farmer. Some way must be found to cut through this surface stubble immediately ahead of the planting apparatus in order to cultivate or loosen the soil to enable the planting apparatus to function as intended. Typically, this has been achieved by attaching coulters to the planter ahead of the opener.

While it is known in the prior art to attach coulters to a planting apparatus, these typical devices have attached the coulter closely adjacent the opener foot or wheel. In a towed planter, therefore, the coulter is approximately the same distance from the tractor hitch as the opener. A serious drawback to these known prior art devices is that they cannot be used on very hard or rocky soil, or where the stubble is particularly difficult, such as soybean stubble or alfalfa sod. These known devices do not enable the planter to develop sufficient down force on the coulters to break through the surface. One way of surmounting this problem has been to attach ballast weights to the planter in order to increase its weight and, consequently, the down force on the coulters. However, this has proven to be no real solution to the problem, since the increased weight of the planter merely increases the farmer's operating costs insofar as it costs more to run the tractor to pull such a heavier object.

It is also known to provide other attachments, such as harrows, to a planter in order to cultivate the soil prior to the planting operation. However, such implements are not compatible with minimum-till or no-till farming considerations since they cultivate more of the soil surface than is necessary or desirable.

Another attempt at solving the aforementioned problems has been to insert a separate implement carriage between the tractor and the planter apparatus in order to cultivate the soil prior to planting. These devices involve separate frames with coulters or teeth elements to engage and cultivate the soil prior to drawing the planter over it. Again, these have not proven to be a satisfactory solution to the problem due to the cost of purchasing an entirely new and separate implement and the consequent increases in operating costs.

A further drawback of the prior art is that the coulters have been permanently attached to the planter apparatus and could not be readily detached therefrom without a major investment in time and money. Thus, the farmer was prevented from using the planter device by itself should the need arise.

SUMMARY OF THE INVENTION

The instant invention obviates the aforementioned difficulties and problems associated with the prior art devices by providing a coulter assembly that is readily attachable and detachable to a standard planter apparatus. The invention comprises a framework, to which the coulters are attached by "U" bolts or the like, which framework, in turn, is bolted onto the planter apparatus. This framework assembly bolts directly to the frame of the planter assembly and serves to locate the coulters in a more forward direction than the prior art devices. Thus, in a towed planter assembly, the weight of the planter itself provides more down force to the coulters than the prior art devices. This feature of the invention enables its use in hard or rocky soil, or in soil with stubble without the necessity of adding ballast weights to the planter.

The ease with which this assembly attaches to a standard planter enables the farmer to convert such a planter into a no-till device, while at the same time allowing the farmer to readily detach the assembly to use the planter by itself if desired. Modification of the planter frame is not required with attachment and detachment of the assembly requiring only a few bolts. Also, the coulter framework does not prohibit adjustments and repairs to the seed planter apparatus while in place. The coulters are pivotally attached to the framework to allow them to swivel, thereby permitting contour forming or farming on irregular ground.

In a second embodiment, the coulter assembly is made pivotal with respect to the mounting framework to allow the coulters to be moved upwardly out of contact with the ground. An hydraulic cylinder actuated by the hydraulic circuit on the tractor is connected between the pivotable coulter assemblies and the stationary framework so that actuation of the cylinder causes the coulters to be raised. This enables the farmer to utilize the seed planter with or without the coulters, while avoiding the necessity of removing the framework from the planter apparatus. This second embodiment also retains the easy attachment features and does not require any modification of the planter itself.

DETAILED DESCRIPTION OF THE PREFERRED EMBODIMENTS

Figure 1:
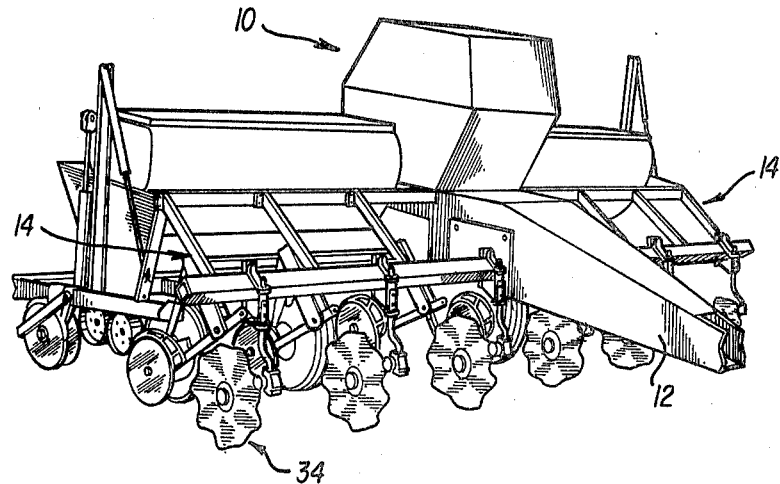
FIG. 1 is a perspective view of a standard seed planter showing a first embodiment of the invention attached thereto.

The coulter framework assembly according to the invention is shown in FIG. 1 attached to a standard planting device 10, such as manufactured by John Deere, Allis Chalmers or International Harvester. The tongue 12 is shown broken away, although it is understood that the forwardmost portion of this tongue 12 attaches to a standard towing hitch of a tractor (not shown). The planter 10 is a standard item and generally comprises storage means for seeds and fertilizer, means to automatically create a furrow in the ground, means to automatically dispense the seeds into the furrow, and means to cover the deposited seeds. All of these elements are well known in the art and none are to be considered as part of this invention.

Figure 2:
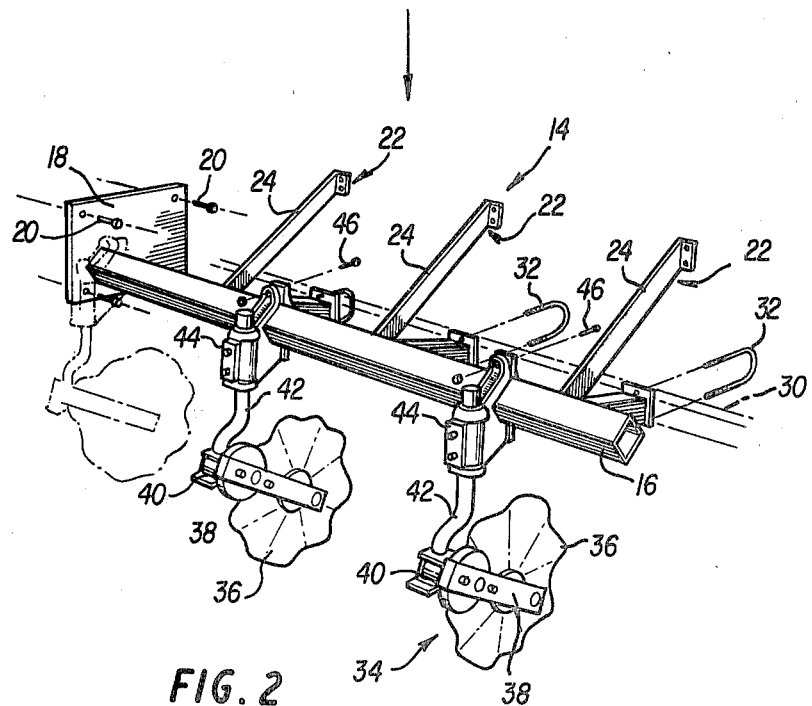
FIG. 2 is an exploded perspective view showing one of the coulter framework assemblies of FIG. 1.
Figure 4:
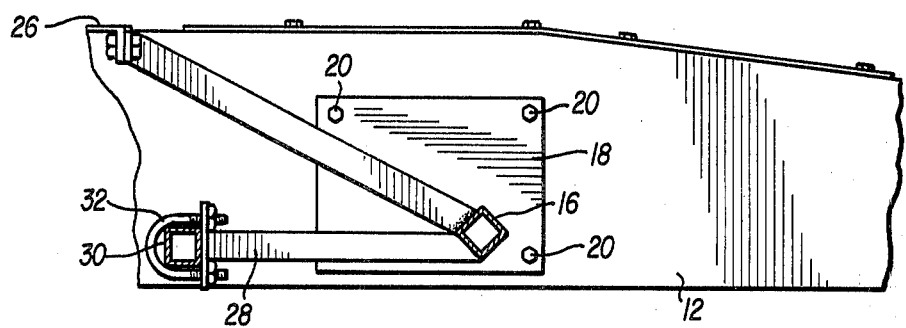
FIG. 4 is a sectional view of the coulter framework taken along lines A—A in FIG. 3.
Figure 3:
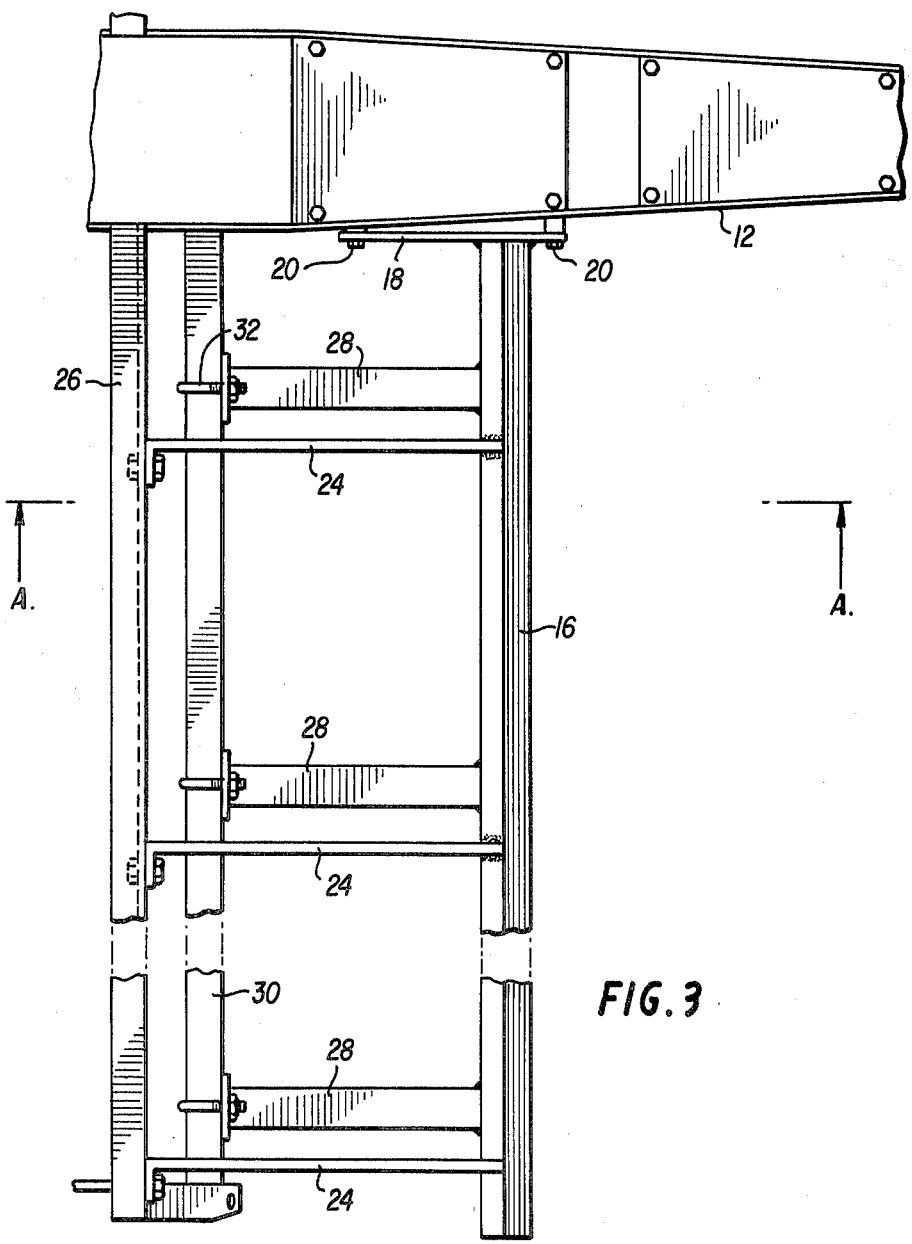
FIG. 3 is a partial plan view showing the coulter framework of FIG. 1 attached to one side of a planter.

The coulters 34 are attached to the planter by way of framework assemblies 14 attached to either side of tongue 12 as shown in FIG. 1. A detailed view of one of these framework assemblies 14 is shown in FIGS. 2-4, it being understood that the framework assembly 14 on the opposite side is a mirror image of this and that the constructional details are the same in each case.

Framework assembly 14 comprises lateral member 16 having one end attached to mounting plate 18 by any convenient means, such as welding, bolting, or the like. Lateral member 16 may be fabricated of any material having suitable strength, but has been found that steel tubing having a generally square cross section of 3½ inches on a side and a ⅜ inch wall thickness possesses sufficient strength and rigidity. Mounting plate 18 may be steel plate of ¼ inch thickness or any other suitable material. Mounting plate 18 is attached to the sides of tongue 12 by way of bolts 20 located near each corner of the rectangular plate. Lateral members 16 are further supported by a plurality of braces 22. Each brace 22 comprises upper brace arms 24 having one end attached to lateral member 16, such as by welding, and its opposite end attached to flange 26 which is part of the structure of planter 10. Lower support arms 28 also are attached to lateral member 16, such as by welding, and have their other ends attached to lateral brace 30, which forms part of seed planter 10. The attachment between lower support bracket 28 and lateral brace 30 may be achieved by mounting flanges on the distal end of bracket 28 and engaging a plurality of "U" bolts 32 around lateral member 30. Obviously, any other form of attachment may be utilized which will enable the frame 14 to be easily detached from the planter 10. Although only three braces are shown attached to lateral member 16, any number may be utilized depending, of course, on the width of the planter.

Coulters 34 are standard items and generally comprise a ribbed or fluted wheel 36 attached to arm 38 so as to rotate with respect thereto. Arm 38 is fastened to attaching bracket 40 mounted on support shaft 42 so as to pivot about the longitudinal axis of support shaft 42. This pivoting or swiveling movement permits the coulters to be utilized on uneven terrain or when contour farming. Shaft 42 is attached to lateral member 16 by way of clamping device 44 which fits around lateral member 16 and is retained in position by bolts 46. The coulters are laterally adjustable along lateral support member 16 by loosening bolts 46 and physically moving them to their desired location. This enables the coulters to be utilized with planters having different spacing between the rows.

Figure 5:
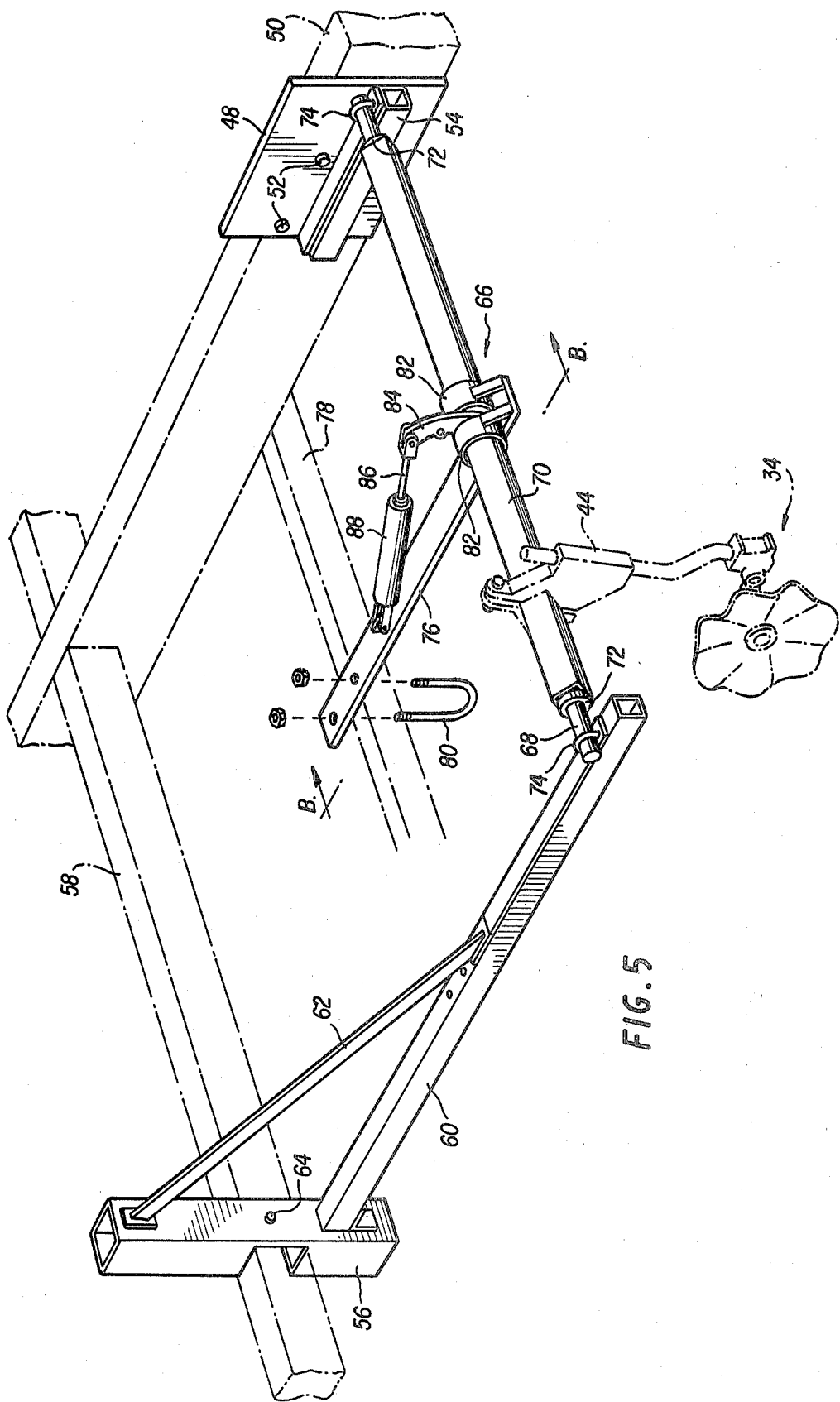
FIG. 5 is a perspective view of a retractable coulter framework assembly according to a second embodiment of the invention.
Figure 6:
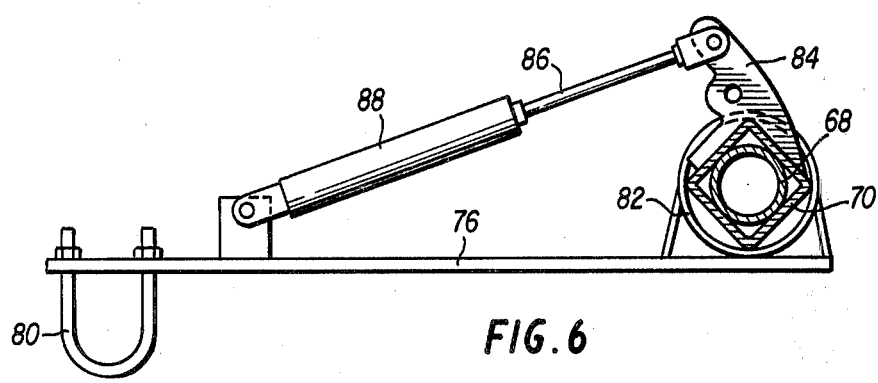
FIG. 6 is a sectional view taken along lines B—B in FIG. 5.
Figure 7:
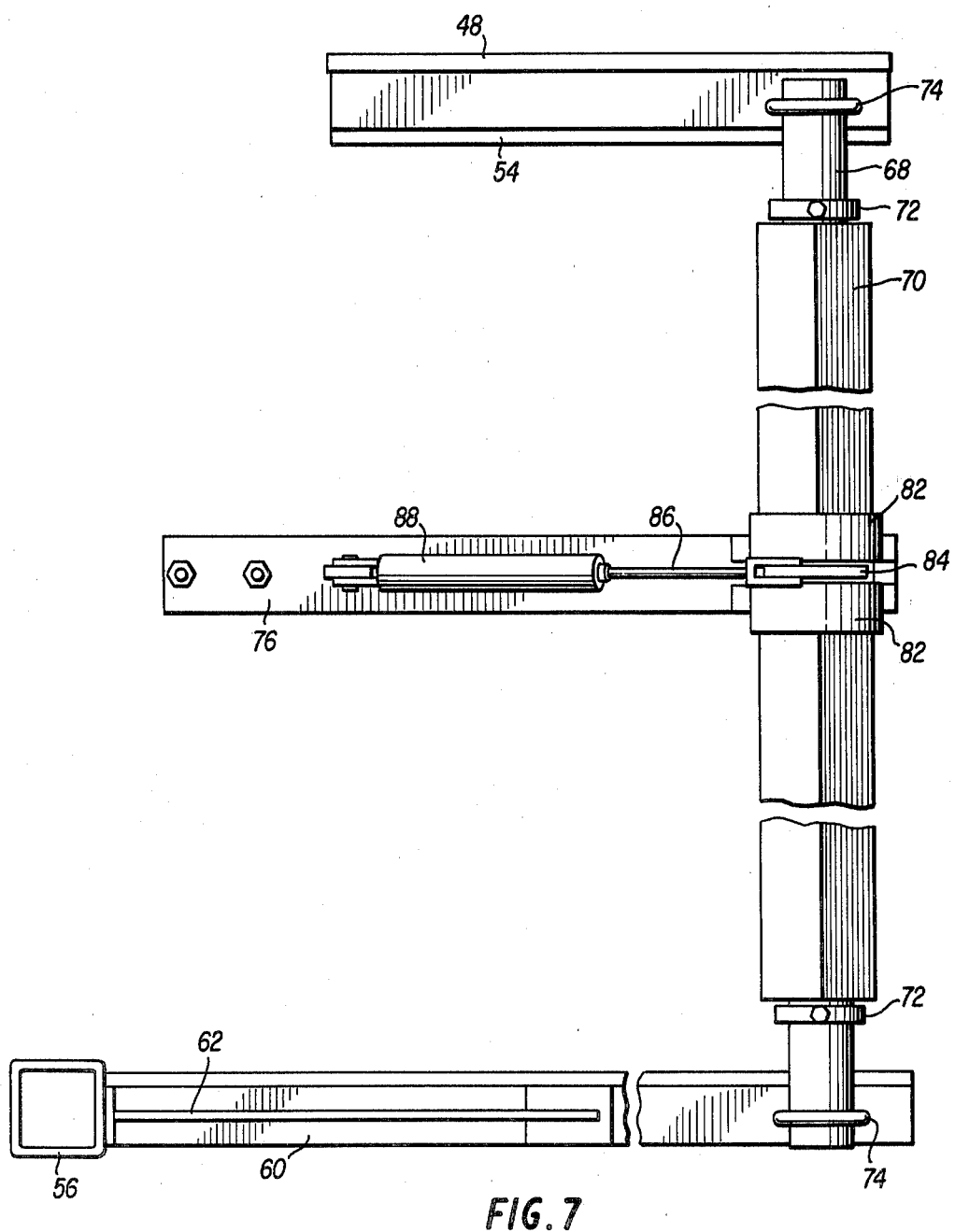
FIG. 7 is a plan view of the retractable coulter framework shown in FIG. 5.

A second embodiment, shown in FIGS. 5-7, allows the coulters to be mounted to the planter 10 such that they may be selectively raised out of contact with the ground when desired. In this embodiment, mounting plate 48 is attached to tongue 50 of planter 10 by bolts 52 or other known means. Mounting plate 48 has attached thereto support member 54 which comprises a generally square cross section steel tube having dimensions on the order of 2½ inch square by ¼ inch wall thickness. This may be attached to plate 48 by welding or similar means.

An outer support bracket comprises vertical member 56 having a notch therein to fit over lateral brace 58, which is part of seed planter 10. Longitudinal member 60 is attached to vertical member 56 such as by bolting or welding. Brace 62 is attached to the upper portion of vertical member 56 and to the member 60 to provide additional support and rigidity. This support may be assembled prior to mounting on the planter and may be attached thereto as a complete unit by way of bolts 64 passing through member 58, or by means of standard "U" bolts (not shown) which pass around member 58 and through vertical member 56. Both members 56 and 60 are preferably made of steel and have generally square cross-sectional shapes, member 56 having dimensions of approximately 4 inches on a side and a wall thickness of ⅜ inch, while member 60 is approximately 2 inches square and has a ¼ inch wall thickness. Although these dimensions have been found to provide adequate support, different sizes may obviously be substituted therefore without exceeding the scope of this invention.

Lateral support member 66 comprises axle 68 having a circular cross-section about which sleeve 70 is disposed so as to rotate with respect to the axle 68. Collars 72 are attached to axle 68 and are located at either end of sleeve 70 to prevent relative axial movement between the axle and the sleeve. The ends of axle 68 are supported by members 54 and 60, and are attached thereto by "U" bolts 74. Coulters 34 are attached to sleeve 70 by way of clamping device 44, previously described. Although only one coulter is shown in FIG. 5, obviously any number may be attached along the length of sleeve 70.

The central portion of lateral support member 66 is supported by cylinder bracket 76 which is, in turn, mounted to lateral brace 78 of planter 10 by way of "U" bolt 80. The distal end of cylinder bracket 76 has cylindrical elements 82 attached thereto which surround the sleeve 70 to prevent undesired movement transverse to the longitudinal axis of the sleeve. These may be attached to bracket 76 by welding or other known methods. Sleeve 70 has arm 84 rigidly attached thereto such that it extends between support elements 82 as shown. Arm 84 is connected to piston rod 86 of hydraulic cylinder 88 which is also attached to bracket 76. The hydraulic cylinder 86 is connected to the hydraulic circuit of the towing tractor by known methods (not shown) and may be controlled by control valves installed at the tractor's operating station. These elements are believed to be well known in the art and no further description is believed to be necessary. Thus, as can be seen, when piston rod 86 is caused to be extended from cylinder 88 it will cause the rotation of sleeve 70 about axle 68 and raise coulters 34 to a retracted position out of contact with the ground. This will enable the planter to be used in a conventional manner when desired.

Thus, it can be seen that the invention constitutes a rugged and reliable support for coulters that may be readily attached to a conventional seed planter without undertaking extensive modifications of the planter or inhibiting maintenance of the planter mechanism.

Figure 8:
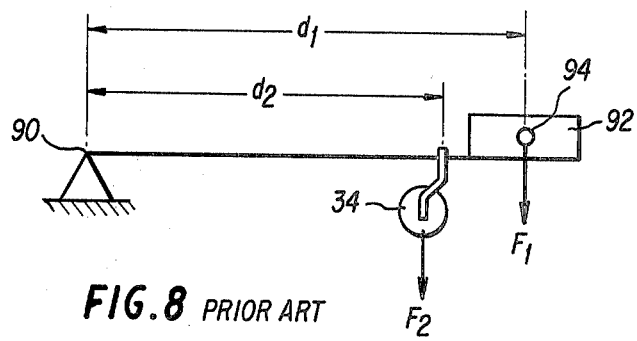
FIG. 8 is a schematic force diagram of a prior art device.
Figure 9:
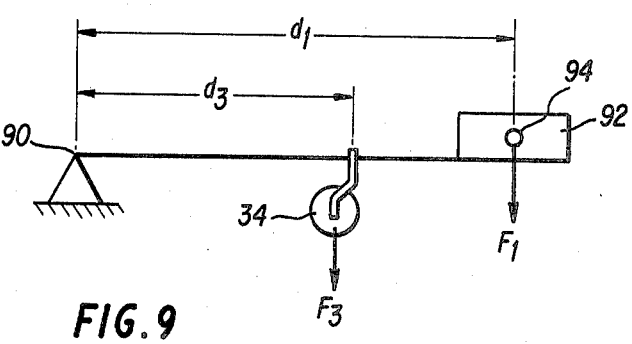
FIG. 9 is a schematic force diagram of the present invention.

An important aspect of the invention resides in locating the coulters close to the hitch point between the planter tongue 12 and the tractor. This results in a more efficient use of the weight of the planter itself to provide more down force on the coulters than the prior art devices. This is schematically indicated in the force diagrams shown in FIGS. 8 and 9 wherein 90 represents the hitching point between the planter tongue and the tractor, and block 92 represents planter 10. Force $F_1$, which is the weight of the planter, acts through the center of gravity 94 of the planter at a distance $d_1$ from fulcrum point 90. In the prior art devices, coulters 34 were located close to the planter structure indicated by block 92 and schematically shown as distance $d_2$ from fulcrum point 90. The resultant force $F_2$ acts to force coulter 34 down into the soil.

In the instant invention, coulters 34 are located closer to the fulcrum point 90 than the prior art devices, at a distance $d_3$ therefrom. Thus, $d_2$ is greater than $d_3$. In both of these schematic representations, it will be assumed that the planter weighs the same and that $F_1$ and $d_1$ are the same in each case.

The torque or tendency to rotate about a pivot point is defined as force times distance. Thus, $F_1 \times d_1 = F_2 \times d_2$. Also, $F_1 \times d_1 = F_3 \times d_3$. Thus, since $f_1$ and $d_1$ are the same in each case, it is quite clear that $F_2 \times d_2$ must be equal to $F_3 \times d_3$. If the distances and forces are transposed, the equation becomes $d_2/d_3 = F_2/F_3$. Since it is known that $d_2$ is greater than $d_3$, this fraction must be greater than 1. Since $F_3/F_2$ therefore, is greater than 1, $F_3$ must be greater than $F_2$. Accordingly, the location of coulters 34 closer to the fulcrum point than the prior art devices enables the instant invention to generate a greater down force on the coulters using only the weight of the seed planter itself without the necessity of extra ballast as in the prior art devices. This enables the present invention to meet no-till or minimum-till criteria in the cases where the soil is hard or rocky, or where there is excessive or stubborn stubble on the soil.

The foregoing description of the preferred embodiments is for illustrative purposes only and should in no way be construed as limiting the scope of the invention which is determined solely by the appended claims.

I claim:

1. Apparatus for converting a standard towed seed planter, including a frame and an associated tongue for connection to a source of motive power, into a minimum-till or no-till planter comprising:
   (a) a framework including a pair of elongate tool support members;
   (b) means for readily and detachably securing the framework to the frame and the tongue of the planter and spaced forwardly thereof so as not to interfere with the functions of the planter, which securing means includes:
      i. means for attaching one end of each support member to the tongue; and
      ii. at least one rearwardly extending brace including a pair of diverging arms carried by each support member for attachment to the planter frame;
   (c) at least one coulter having an upper mounting portion rigidly connected to each support member for engaging the ground surface upon application of downward force to the coulter; and
   (d) wherein when the framework is secured to the planter frame and tongue, the support members extend laterally from opposed sides of the tongue and are positioned sufficiently forward of the planter so as to maximize the downward force applied to the coulter resulting from torque developed by the weight of the planter about a fulcrum defined at the point of connection between the tongue and the source of motive power.

2. The apparatus of claim 1 wherein the coulter is attached to the support member so as to swivel about an axis generally perpendicular to the longitudinal axis of the support member.

3. The apparatus of claim 1 further including means for raising and lowering the coulter with respect to the ground surface.

* * * * *